Dec. 26, 1939. L. R. COBB 2,184,710
SHUTTER FOR MOTION PICTURE MACHINES
Filed May 23, 1938 2 Sheets-Sheet 1
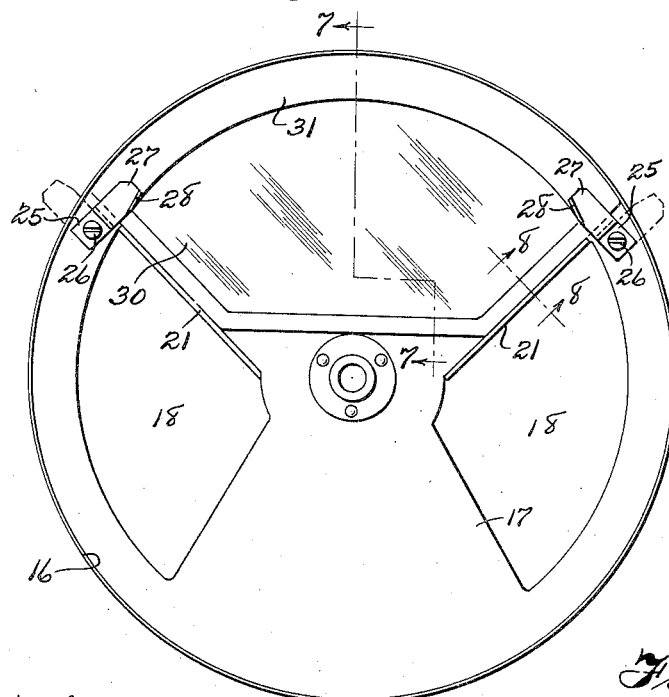
Fig.1.
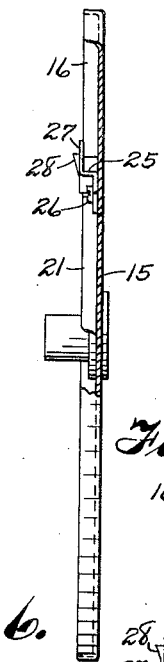
Fig.2.
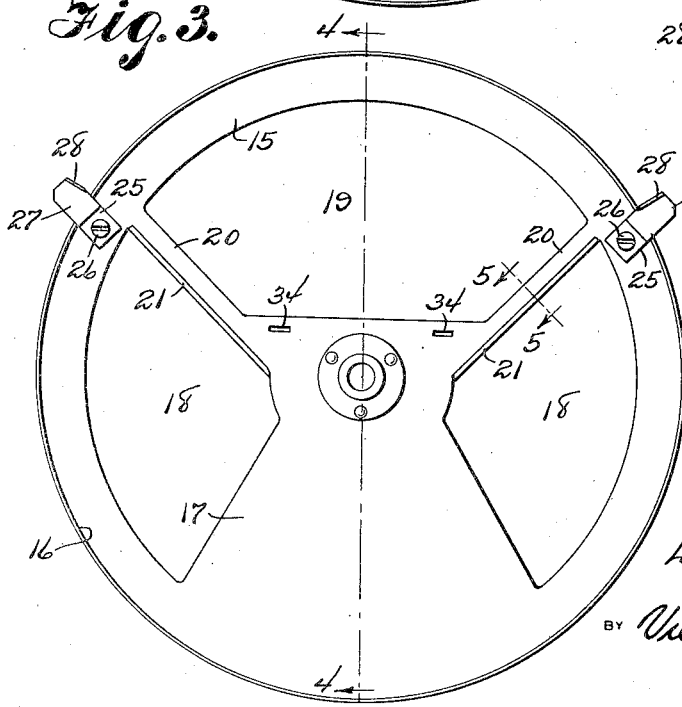
Fig.3.
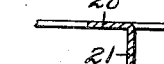
Fig.6.
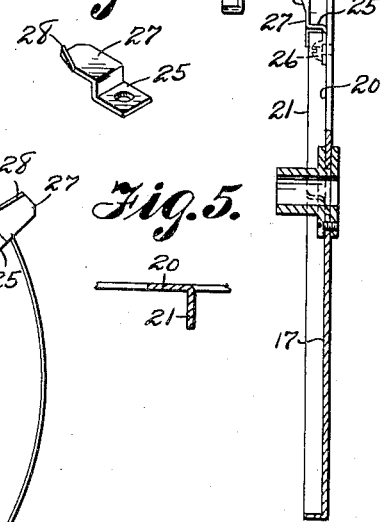
Fig.4.
Fig.5.
Louis R. Cobb
INVENTOR
BY Victor J. Evans & Co.
ATTORNEYS Dec. 26, 1939.  L. R. COBB  2,184,710
SHUTTER FOR MOTION PICTURE MACHINES
Filed May 23, 1938   2 Sheets-Sheet 2
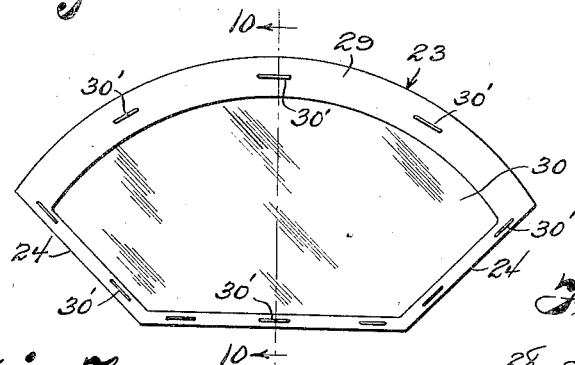
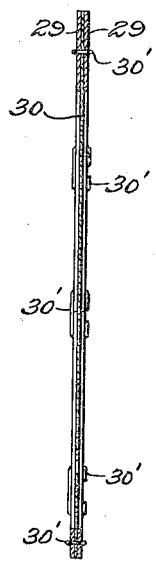
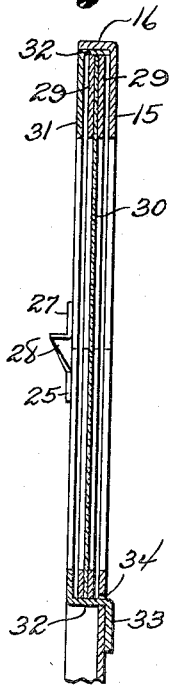
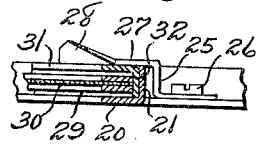
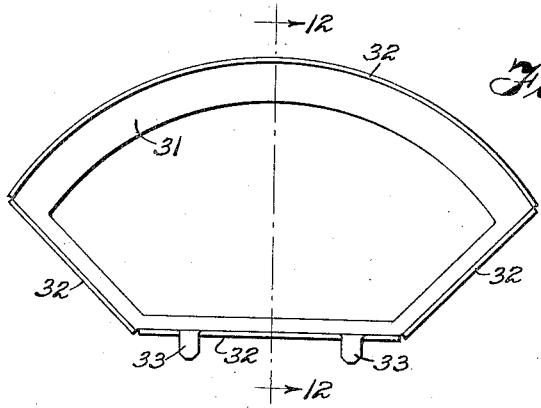
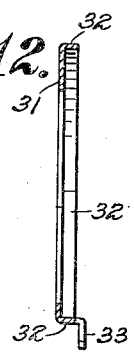
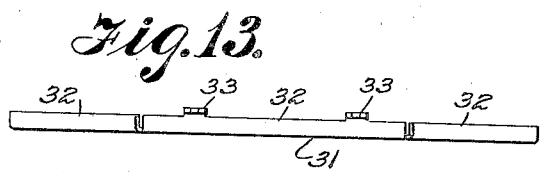
Louis R. Cobb
INVENTOR
BY Victor J. Evans & Co.
ATTORNEYS Patented Dec. 26, 1939

2,184,710

UNITED STATES PATENT OFFICE 2,184,710

SHUTTER FOR MOTION PICTURE MACHINES

Louis R. Cobb, Hopkinsville, Ky.

Application May 23, 1938, Serial No. 209,581

4 Claims. (Cl. 88—19.3)

This invention relates to shutters for motion picture projecting machines and more particularly to the rotary type having an obscuring blade and an intercepting blade alternately covering the lens exposure aperture, that is to say, the obscuring blade being proportioned and timed in its movement to cover the lens exposure aperture during the period of movement of the film and the intercepting blade passing through the light beam during the period the film is at rest.

In practice it has been found that by proportioning the area of the intercepting blade according to the period of projection exposure, flickering has been overcome, but with considerable reduction in the light intensity and sharpness and depth of the picture projected on the screen. Many attempts have been made to improve upon the shutters whereby to not only produce a brighter and more sharply defined picture on the screen but to also improve the color of the beam. This has been done by the provision of an intercepting blade made of a transparent or translucent material of a particular color which is chosen with respect to the spectral character of the light source so that the contrast between the black and white portions of the projected picture will be more sharply defined.

While the foregoing described improvements in the shutter have added greatly to the desirable qualities of the picture as projected on the screen there are some disadvantages in the use of certain materials of which the transparent or translucent intercepting blade is made. For example, if the blade is made of glass there is not only the liability of breakage but its weight is such that the shutter will be overbalanced, while if made of Cellophane, frequent renewal is necessary because the latter cannot be readily cleansed.

The present invention has for one of its objects to improve generally upon shutters of the foregoing described character.

The particular object is to provide a colored insert for the intercepting blade which may be readily removed and replaced with a new one from time to time.

With the foregoing and other objects to be attained, as will hereinafter more fully appear, the invention consists in the novel general structure and in the parts and combinations and arrangements of parts as hereinafter described and set forth in the appended claims, reference being had to the accompanying drawings illustrating a practical adaptation of the invention, and in which:

Figure 1 is a face view of the shutter with the insert for the intercepting blade in position;

Figure 2 is an edge view of the shutter with portions broken away and shown in section;

Figure 3 is a view similar to Figure 1, with the intercepting blade insert removed;

Figure 4 is a section on the line 4—4 of Figure 3;

Figure 5 is a fragmentary section on the line 5—5 of Figure 3;

Figure 6 is a detailed view of a retaining button detached;

Figure 7 is a section on the line 7—7 of Figure 1, on an enlarged scale;

Figure 8 is a section on the line 8—8 of Figure 1, on the same scale as Figure 7;

Figure 9 is a face view of the intercepting blade insert detached;

Figure 10 is a section on the line 10—10 of Figure 9, on an enlarged scale;

Figure 11 is a face view of the holder for the intercepting blade insert;

Figure 12 is a section on the line 12—12 of Figure 11; and

Figure 13 is an edge view of the holder shown in Figure 11.

Referring now to the drawings, the numeral 15 indicates generally the shutter which is formed circularly of sheet metal and provided with a peripheral flange 16 for giving rigidity to the structure, said shutter having the usual obscuring blade 17 which is segmental or sector shaped and opaque throughout. At opposite sides of the obscuring blade 17 the body plate of the shutter is cut out to provide substantially diametrically opposed segmental openings 18 for beam transmission, while between said openings 18 and diametrically opposed to the obscuring blade 17, the body of the plate of the shutter is cut out to provide a segmental opening 19. Preferably, the opening 19 is of considerably larger area than each of said openings 18 and also of a larger area than said obscuring blade 17.

As shown more clearly in Figure 3, the segmental openings 18 and 19 are separated by narrow diagonal bars or spoke members 20 each of which are flanged along one edge, as at 21, said flanges 21 in addition to stiffening the bars or spoke members 20, serving to support an intercepting blade insert to be now described.

The insert comprising the intercepting blade of the shutter is shown detached and in structural detail in Figures 9 and 10, and in assembled position on the shutter in Figure 1. As shown, the insert is generally segmental in form, having an arcuate peripheral portion 23 to fit against the inside of the annular flange 16 of the shutter and inclined opposite end portions 24 to engage the correspondingly inclined flanges 21 of said diagonal bars or spoke members 20 of the shutter body. With the insert applied to the shutter as shown in Figure 1 it is held in place by turn buttons 25 which are pivotally mounted on the shutter, as at 26, and each having an offset portion 27 overlapping the adjacent portion of the insert, said offset portions 27 being marginally flanged, as at 28, to provide finger grasps for convenience in turning the buttons into and out of locking position.

Preferably, the insert comprises two like frame members 29 which are cut or stamped out of heavy cardboard or fibre sheets with a sheet of colored Cellophane or similar characteristic material 30 fastened therebetween either by cement or wire stapling 30', or both.

As a practical means for detachably mounting the insert on the shutter and for holding it securely in place during the rotation of the shutter, it is preferable to provide a holder 31 which is formed as a substantial counterpart of the insert frame member 29, said holder 31 having marginal flanges 32 forming a pocket into which the insert is received, said holder having a pair of offset tongues 33 on its inner side portion which are engaged in slots 34 provided in the adjacent body portion of the shutter. With the tongues 33 interlocked in the slots 34, as shown more clearly in Figure 7, and the buttons 25 turned over the adjacent outer corner portions of the holder as shown in Figure 1, the interposed insert is securely held between the adjacent body portions of the shutter and said holder, and at the same time the insert is readily removable and replaceable. This is of material advantage and one of the salient features of the present invention inasmuch as the picture is projected through the transparent colored insert and the need arises for renewing said insert because of it becoming soiled in use and necessitating its renewal to prevent blurring of the projected picture. In this connection, it is noted that the Cellophane or other characteristic insert can be changed without removing the shutter from the projecting machine.

It is here again stressed that as an important characteristic feature of the present invention the colored insert of the intercepting blade is not intended merely as a filter or light absorbing medium but that the picture is projected therethrough at the time said blade passes in front of the exposure opening in front of the lens, and the particular color of said transparent insert depends upon the character of the light source or lamp employed in the machine as the projection light. More generally, where a tungsten or other lamp is used and the light beam produces a spectral unbalance, due to the excess of yellow light, it is found that the use of a blue transparent insert has a corrective balancing effect in the light rays of the beam which brings out the picture on the screen with more depth and definition. This is of the essence of the invention as well as the structural features entering into the removability and replacement of the colored transparent inserts.

Obviously, the structure admits of considerable modification within the spirit of the invention as defined by the appended claims. The invention, therefore, is not limited to the specific construction and arrangements shown in the accompanying drawings.

What is claimed is:

1. A rotary shutter for motion picture projecting machines, comprising a generally flat plate-like body having a sector-shaped obscuring blade portion, a diametrically opposed similarly shaped intercepting panel opening and normal beam openings on opposite sides of the axis of the shutter body and interposed between said obscuring blade portion and intercepting panel opening in the rotative path thereof, the framing of said intercepting panel opening comprising an arcuate peripheral strip of the shutter body, an opposed central portion of the body and diagonal spoke-like opposite end members connecting said peripheral and central body portions, said peripheral and end members being flanged at their outer margins, a marginally flanged counterpart holder frame to fit registrably within the flanged body framing of the intercepting panel opening, a panel comprising a correspondingly shaped generally flat frame to fit within the marginally flanged holder frame and having mounted thereon a characteristically colored closure sheet of light penetrable material, and means for detachably securing said holder frame to the shutter body.

2. The structure set forth in claim 1 and further describing the securing means for said holder frame as comprising offset rightangular lugs located on the inner member of the frame insertable in apertures provided therefor in the adjacent body portion of the shutter, and retaining members movably mounted on the adjacent peripheral portion of the shutter body for releasable engagement with the opposite peripheral corner portions of the holder frame.

3. A rotary shutter for motion picture projecting machines, comprising a generally flat body having a sector-shaped opening therein, said opening being framed by an arcuate peripheral strip of the body, an opposed central portion of the body and spoke-like opposite end members connecting said peripheral and central body portions, said peripheral body portion and spoke-like members being flanged at their outer margins, a marginally flanged counterpart sector-shaped holder frame to fit registrably within the marginally flanged portions of the framing of the opening, an intercepting panel comprising a generally flat sector-shaped frame and a characteristically colored closure sheet of light penetrable material secured marginally to said last named frame, said frame being removably fitted to the holder frame and the latter being mountable inversely in correlation to the intercepting panel opening of the shutter body, and means for detachably securing the mounted holder frame in place including offset rightangular lugs on the inner marginal portion of the holder frame to fit interlockingly in apertures provided therefor in the adjacent central body portion of the shutter, and latch buttons movably mounted on the adjacent circumferential portions of the shutter body for releasable engagement over the opposite peripheral corner portions of the holder frame.

4. A shutter for motion picture projecting machines, comprising a peripherally flanged flat circular body, said body including an opaque segmental obscuring blade portion, segmental openings on opposite sides of said blade portion, said body having a segmental opening diametrically opposed to said opaque blade portion and located between and separated from said two other openings by narrow spoke portions, said spoke portions having longitudinal flanges, a counterpart holder frame having an arcuate peripheral flange to abut the peripheral flange of said rotatable body and having a straight flanged opposite side, said arcuate and straight portions being connected by flanged diagonal end portions arranged to abut the flanged spoke portions of the rotatable body, means for detachably engaging the straight side portion of said holder frame with the adjacent central portion of the rotatable body, means for releasably fastening the opposite peripheral corner portions of the holder frame to the adjacent peripheral portion of said rotatable body, and an intercepting panel insertable between said rotatable body and said holder frame, said panel including a counterpart segmental frame and a sheet of colored transparent material covering the segmental opening in said rotatable body when the panel is secured thereon.

LOUIS R. COBB.